(12) United States Patent
Gupta et al.

(10) Patent No.: US 7,491,682 B2
(45) Date of Patent: Feb. 17, 2009

(54) METHOD OF INHIBITING OR CONTROLLING FORMATION OF INORGANIC SCALES

(75) Inventors: D. V. Satyanarayana Gupta, The Woodlands, TX (US); Joseph W. Kirk, The Woodlands, TX (US)

(73) Assignee: BJ Services Company, Houston, TX (US)

( * ) Notice: Subject to any disclaimer, the term of this patent is extended or adjusted under 35 U.S.C. 154(b) by 343 days.

(21) Appl. No.: 11/012,887

(22) Filed: Dec. 15, 2004

(65) Prior Publication Data

US 2006/0124301 A1    Jun. 15, 2006

(51) Int. Cl.
*E21B 43/28* (2006.01)
*E21B 21/00* (2006.01)
*C09K 8/528* (2006.01)

(52) U.S. Cl. ............... 507/224; 166/270; 166/271; 507/219; 507/221

(58) Field of Classification Search ........... 507/219, 507/221, 224; 166/270, 271
See application file for complete search history.

(56) References Cited

U.S. PATENT DOCUMENTS

| | | | |
|---|---|---|---|
| 1,570,537 A | 1/1926 | Teitsworth | |
| 3,179,170 A | 4/1965 | Burtch et al. | |
| 3,850,248 A | 11/1974 | Carney | |
| 4,108,779 A | 8/1978 | Carney | |
| 4,552,591 A | 11/1985 | Millar | |
| 4,738,897 A | 4/1988 | McDougall et al. | |
| 4,986,353 A | 1/1991 | Clark et al. | |
| 5,224,543 A * | 7/1993 | Watkins et al. | 166/279 |
| 5,741,758 A | 4/1998 | Pakulski | |
| 5,758,725 A | 6/1998 | Streetman | |
| 5,893,416 A | 4/1999 | Read | |
| 5,922,652 A | 7/1999 | Kowalski et al. | |
| 5,964,291 A | 10/1999 | Bourne et al. | |
| 6,025,302 A | 2/2000 | Pakulski | |
| 6,209,643 B1 | 4/2001 | Nguyen et al. | |
| 6,209,646 B1 | 4/2001 | Reddy et al. | |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,439,310 B1 | 8/2002 | Scott, III et al. | |
| 6,527,051 B1 * | 3/2003 | Reddy et al. | 166/300 |
| 6,723,683 B2 | 4/2004 | Crossman et al. | |
| 6,866,797 B1 | 3/2005 | Martin et al. | |
| 2002/0128157 A1 | 9/2002 | Bates et al. | |
| 2004/0060702 A1 | 4/2004 | Kotlar et al. | |
| 2005/0028976 A1 | 2/2005 | Nguyen et al. | |
| 2005/0034868 A1 | 2/2005 | Frost et al. | |
| 2006/0065396 A1 | 3/2006 | Dawson et al. | |

FOREIGN PATENT DOCUMENTS

| | | |
|---|---|---|
| CA | 1262507 | 10/1989 |
| GB | 2298440 | 9/1996 |
| WO | WO 99/36668 | 7/1999 |
| WO | WO 99/54592 | 10/1999 |
| WO | 0011949 A1 | 3/2000 |
| WO | 2002040827 A1 | 5/2002 |
| WO | WO 2005/017313 A1 | 2/2005 |

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.

P.J.C. Webb AEA Technology PLC, T.A., et al; Economic and Technical Advantages of Revolutionary New Delivery System for Fractured and Gravel Packed Wells; SPE 38548; 1997.

P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hyrdraulic Fracturing for Reservoir Management Production Enhancement, Scale Control and Asphaltine Prevention; SPE 71655; 2001.

McIninch, et al; New Relationship Between Oil Company and Service Company Rejuvenates a Mature north Sea Gas Field ; SPE 78327; 2002.

* cited by examiner

*Primary Examiner*—Timothy J Kugel
(74) *Attorney, Agent, or Firm*—Jones & Smith, LLP; John Wilson Jones

(57) ABSTRACT

A well treating composition of a composite containing a scale inhibitor adsorbed onto a water-insoluble adsorbent is useful in the control, formation and treatment of inorganic scales in a subterranean formation or wellbore. In addition, the well treating composition is useful in controlling the rate of release of scale inhibitor in the wellbore. The water-insoluble adsorbent may be activated carbon, silica particulate, precipitated silica, zeolite, diatomaceous earth, ground walnut shells, fuller's earth and organic synthetic high molecular weight water-insoluble adsorbents. The composite may be introduced into an oil or gas well with a carrier fluid.

21 Claims, 1 Drawing Sheet

METHOD OF INHIBITING OR CONTROLLING FORMATION OF INORGANIC SCALES

FIELD OF THE INVENTION

The invention relates to slow release scale inhibitor composites in oilfield applications and methods of using the same.

BACKGROUND OF THE INVENTION

Scale inhibitors are used in production wells to prevent scaling in the formation and/or in the production lines downhole and at the surface. Scale build-up decreases permeability of the formation, reduces well productivity and shortens the lifetime of production equipment. In order to clean scales from wells and equipment it is necessary to stop the production which is both time-consuming and costly.

Several methods are known in the art for introducing scale inhibitors into production wells. For instance, a liquid inhibitor may be forced into the formation by application of hydraulic pressure from the surface which forces the inhibitor into the targeted zone. In most cases, such treatments are performed at downhole injection pressures below that of the formation fracture pressure. Alternatively, the delivery method may consist of placing a solid inhibitor into the producing formation in conjunction with a hydraulic fracturing operation. This method is often preferred because it places the inhibitor in contact with the fluids contained in the formation before such fluids enter the wellbore where scaling is commonly encountered.

A principal disadvantage of such prior art methods is the difficulty in releasing the inhibitor into the well over a sustained period of time. As a result, treatments must repeatedly be undertaken to ensure that the requisite level of inhibitor is continuously present in the well. Such treatments result in lost production revenue due to down time.

Treatment methods are therefore sought for introducing scale inhibitors into oil and/or gas wells wherein the inhibitor may be released over a sustained period of time. It is desired that such methods not require continuous attention of operators over prolonged periods.

SUMMARY OF THE INVENTION

The invention relates to a well treating composition which consists of a composite of a scale inhibitor adsorbed onto a water-insoluble adsorbent.

In a preferred embodiment, the scale inhibitor is a phosphate, phosphate ester, phosphoric acid, phosphonate, phosphonic acid, a polyacrylamide, a salt of acrylamido-methyl propane sulfonate/acrylic acid copolymer (AMPS/AA), phosphinated maleic copolymer (PHOS/MA), a salt of a polymaleic acid/acrylic acid/acrylamido-methyl propane sulfonate terpolymer (PMA/AMPS) or a mixture thereof.

The composite typically contains a small quantity of scale inhibitor. For instance, the amount of scale inhibitor in the well treating composition may be as low as 1 ppm.

The water-insoluble adsorbent is preferably activated carbon, silica particulate, precipitated silica, zeolite, diatomaceous earth, ground walnut shells, fuller's earth and organic synthetic high molecular weight water-insoluble adsorbents.

The well treating composition may be used to prevent and/or control the formation of inorganic scales in a production well. In addition, the well treating composition may be used to control the rate of release of scale inhibitors in a production well.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
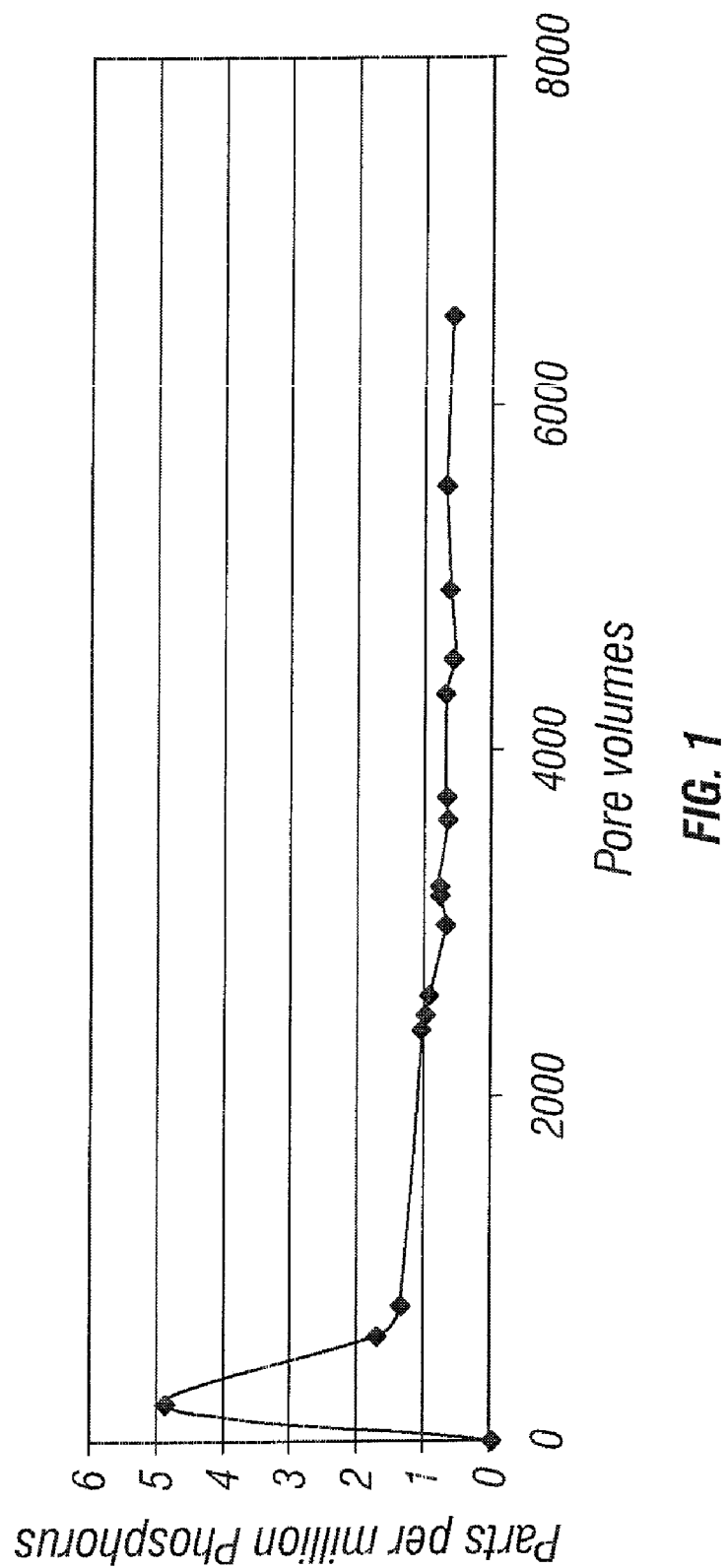
FIG. 1 illustrates the effectiveness of the composite of the invention in a packed sand column.

The well treating composition of the invention consists of a composite of a scale inhibitor adsorbed onto a water-insoluble adsorbent. Adsorption of the scale inhibitor onto the adsorbent reduces the amount of free inhibitor in solution. As a result, only a small amount of inhibitor is released into the water which contacts the composite. A continuous supply of inhibitor may therefore be introduced into a target area.

The well treating composite effectively inhibits, controls or treats deposited inorganic scale formations in subterranean formations, such as oil wells, gas wells and wellbores. The composites of the invention are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

Scale inhibitors suitable for use in the composites of the invention include any liquid material which is capable of either preventing or at least substantially reducing the formation of inorganic scales within the production well. If the inhibitor is a solid, it can be dissolved in a suitable solvent, thus making it a liquid.

Suitable scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

The composite of the invention does not require excessive amounts of scale inhibitor. The amount of scale inhibitor in the composition is that amount sufficient to prevent, or to at least substantially reduce the degree of, scale formation. Generally, the amount of scale inhibitor in the composite is from about 0.05 to about 5 (preferably from about 0.1 to about 2) weight percent based upon the total weight of the composite. For most applications, the amount of scale inhibitor in the well treating composite may be as low as 1 ppm. Such small amounts of scale inhibitor may be sufficient for up to 1,000 pore volumes and typically provides up to six months of continuous inhibition. Costs of operation are therefore significantly lowered.

The water insoluble adsorbent may be any of various kinds of commercially available high surface area materials having the affinity to adsorb the desired scale inhibitor. Typically, the surface area of the adsorbent of the well treating composite is between from about 1 m$^2$/g to about 100 m$^2$/g.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of scale inhibitor to water-insoluble adsorbent is generally between from about 90:10 to about 10:90.

The adsorption of the liquid (or solution of) scale inhibitor onto the solid adsorbent limits the availability of the free scale inhibitor in water. In addition, the composite itself has limited solubility in water. When placed into a production well, the scale inhibitor slowly dissolves at a generally constant rate over an extended period of time in the water which is contained in the formation. The controlled slow release of the inhibitor is dependent upon the surface charges between inhibitor and adsorbent which, in turn, is dependent upon the adsorption/desorption properties of the inhibitor to adsorbent.

Generally, the lifetime of a single treatment using the composite of the invention is between six and twelve months depending upon the volume of water produced in the production well and the amount of inhibitor bound to the water-insoluble adsorbent.

The well treating composites of the invention may further contain a carrier fluid. Suitable carrier fluids include brine, fracturing fluids, completion fluids, acidizing compositions, etc. The amount of composite present in the carrier fluid is typically between from about 15 ppm to about 100,000 ppm depending upon the severity of the scale deposition. When present with brine, the weight percentage of the composite is generally between from about 0.02 to about 2 weight percent.

The carrier fluid may further contain between from 0 to about 10 weight percent of an inorganic salt. Suitable inorganic salts include KCl, NaCl, and NH$_4$Cl.

The composites of the invention may be used in any fluids used for the treatment of gas wells or oils wells wherein it is desired to inhibit the formation of scales, control the formation of scales or retard the release of scale inhibitors into the well. For instance, the composite may be used in completion or production services. The composites of the invention may be used in the well to remove scales from or control the formation of scales onto tubular surface equipment within the wellbore. It may be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines.

Such fluids may be introduced down the annulus of the well and, when desired, flushed with produced water.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Preparation of Scale Inhibitor Composite. About 800 g of 10/50 mesh diatomaceous earth (Celite MP-79) absorbent was added into a mixing bowl. A paddle mixer blade was attached and liquid organophosphate (Solutia Dequest 2000) was added to the mixing bowl at a rate in which the liquid was readily absorbed, and the liquid did not puddle. After all of the liquid was added, mixing was continued until a homogenous blend was produced. The blend was then dried at 225 F until the percent moisture of the resulting product was less than 3%. The composite thus prepared contained 25 percent by weight of organophosphate scale inhibitor.

Evaluation of Scale Inhibitor Composite. A length of ½" PVC pipe, 30" in length was fitted with provisions to attach tubing to each end such that water or other fluids could be injected at one end and injected fluids exit at the other end. The column was filled with 225 g of 20/40 mesh Ottawa White sand containing 3.54 g of the composite. The sand and composite were intimately mixed so as to disperse the composite product throughout the entire sand column. The amount of tap water (maintained at 74° F.) required to fill the void spaces in the sand column was 53 ml. Thus, the pore volume of the test column was 53 ml. A peristaltic pump was employed to pump water into the bottom of the column at the rate of 10 ml/min. The effluent from the top of the column was collected periodically and analyzed for the presence of phosphorus ion by ion chromatography. The phosphorus levels were then plotted against pore volume as set forth in FIG. 1. As illustrated, the phosphorus level in the first few pore volumes was in the range of 5 ppm but rapidly fell to 1 ppm and remained at approximately 1 ppm for an extended period of time. The 1 ppm level was sufficient to prevent the formation of scales and indicates the ability of the scale inhibitor composite to render long term protection.

From the foregoing, it will be observed that numerous variations and modifications may be effected without departing from the true spirit and scope of the novel concepts of the invention.

What is claimed is:

1. A method of stimulating a subterranean formation by pumping into the formation, in a single treatment step, a fracturing or acidizing fluid comprising a composite of a liquid scale inhibitor adsorbed onto a water-insoluble adsorbent wherein the scale inhibitor inhibits or controls the formation of inorganic scales by slowly releasing the scale inhibitor into the formation, wherein the surface area of the adsorbent is between from about 1 m$^2$/g to about 100 m$^2$/g, the weight ratio of scale inhibitor to adsorbent in the composite is between from about 9:1 to about 1:9 and the lifetime of the composite introduced in the single treatment step is least six months.

2. The method of claim 1 wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

3. The method of claim 2, wherein the water-insoluble adsorbent is diatomaceous earth or ground walnut shells.

4. The method of claim 3, wherein the water-insoluble adsorbent is diatomaceous earth.

5. The method of claim 1, wherein the scale inhibitor is a phosphate, phosphate ester, phosphoric acid, phosphonate, phosphonic acid, a polyacrylamide, a salt of acrylamido-methyl propane sulfonate/acrylic acid copolymer, phosphinated maleic copolymer, a salt of a polymaleic acid/acrylic acid/acrylamido-methyl propane sulfonate terpolymer or a mixture thereof.

6. The method of claim 5, wherein the scale inhibitor is at least one organo phosphonate, phosphate, phosphate ester and/or the corresponding acid thereof.

7. The method of claim 1, wherein the amount of scale inhibitor in the-composite is between from about 0.5 to about 5 weight percent.

8. A method of controlling the rate of release of a scale inhibitor in a wellbore comprising introducing into the wellbore a well treating composition comprising a composite of a liquid scale inhibitor adsorbed onto a water-insoluble adsorbent having a surface area of from about 1 $m^2$/g to about 100 $m^2$/g and wherein the weight ratio of scale inhibitor to adsorbent in the composite is between from about 9:1 to about 1:9 and further wherein the composite has a lifetime, from a single treatment, of at least six months.

9. The method of claim 8, wherein the scale inhibitor is a phosphate, phosphate ester, phosphoric acid, phosphonate, phosphonic acid, a polyacrylamide, a salt of acrylamido-methyl propane sulfonate/acrylic acid copolymer, phosphinated maleic copolymer, a salt of a polymaleic acid/acrylic acid/acrylamido-methyl propane sulfonate terpolymer or a mixture thereof.

10. The method of claim 9, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

11. The method of claim 10, wherein the water-insoluble adsorbent is diatomaceous earth or ground walnut shells.

12. The method of claim 11, wherein the water-insoluble adsorbent is diatomaceous earth.

13. The method of claim 9, wherein the scale inhibitor is at least one organo phosphonate, phosphate, phosphate ester and/or the corresponding acid thereof.

14. The method of claim 8, wherein the well treating composition further comprises a carrier fluid.

15. The method of claim 14, wherein the carrier fluid is a fracturing fluid.

16. In a method of inhibiting or controlling inorganic scale formations in a subterranean formation or in a wellbore by introducing into the subterranean formation or wellbore a scale inhibitor, the improvement comprising controlling the rate of release of the scale inhibitor by introducing into the subterranean formation or wellbore a composite of a scale inhibitor adsorbed onto a water-insoluble adsorbent, wherein the adsorbent has a surface area of from about 1 $m^2$/g to about 100 $m^2$/g and further wherein the weight ratio of scale inhibitor to adsorbent in the composite is between from about 9:1 to about 1:9, the composite having a lifetime, from a single treatment, of at least six months.

17. The method of claim 16, wherein the composite is pumped into the subterranean formation as a component of an acidizing fluid.

18. The method of claim 16, wherein the composite is pumped into the subterranean formation as a component of a matrix acidizing fluid.

19. The method of claim 16, wherein the composite is pumped into the subterranean formation as a component of a fracturing fluid.

20. The method of claim 16, wherein the scale inhibitor is a phosphate, phosphate ester, phosphoric acid, phosphonate, phosphonic acid, a polyacrylamide, a salt of acrylamido-methyl propane sulfonate/acrylic acid copolymer, phosphinated maleic copolymer, a salt of a polymaleic acid/acrylic acid/acrylamido-methyl propane sulfonate terpolymer or a mixture thereof.

21. The method of claim 16, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

* * * * *